(12) United States Patent
Yoon et al.

(10) Patent No.: US 12,276,940 B2
(45) Date of Patent: Apr. 15, 2025

(54) HOLOGRAPHIC MICROSCOPE INCLUDING HOLOGRAPHIC IMAGE SENSOR

(71) Applicant: KOREA PHOTONICS TECHNOLOGY INSTITUTE, Gwangju (KR)

(72) Inventors: Seon Kyu Yoon, Gwangju (KR); Kyung Il Joo, Naju-si (KR); Ha Mong Shim, Gwangju (KR)

(73) Assignee: KOREA PHOTONICS TECHNOLOGY INSTITUTE, Gwangju (KR)

( * ) Notice: Subject to any disclaimer, the term of this patent is extended or adjusted under 35 U.S.C. 154(b) by 507 days.

(21) Appl. No.: 17/744,627

(22) Filed: May 14, 2022

(65) Prior Publication Data
US 2023/0213890 A1 Jul. 6, 2023

(30) Foreign Application Priority Data

Dec. 30, 2021 (KR) .......................... 10-2021-0192126

(51) Int. Cl.
*G03H 1/04* (2006.01)
*G03H 1/00* (2006.01)

(52) U.S. Cl.
CPC ......... *G03H 1/0443* (2013.01); *G03H 1/0005* (2013.01); *G03H 2001/005* (2013.01); *G03H 2222/12* (2013.01); *G03H 2222/53* (2013.01); *G03H 2223/24* (2013.01); *G03H 2226/02* (2013.01)

(58) Field of Classification Search
CPC ............... G03H 1/0443; G03H 1/0005; G03H 2001/005; G03H 2222/12; G03H 2222/53; G03H 2223/24; G03H 2226/02
See application file for complete search history.

(56) References Cited

U.S. PATENT DOCUMENTS

| | | | | |
|---|---|---|---|---|
| 2004/0156098 | A1* | 8/2004 | Dubois | G01N 21/6458 359/368 |
| 2008/0018966 | A1* | 1/2008 | Dubois | G02B 21/22 359/9 |
| 2008/0116465 | A1* | 5/2008 | Moon | H01L 33/0004 257/E33.044 |

* cited by examiner

*Primary Examiner* — James A Dudek
(74) *Attorney, Agent, or Firm* — Dinsmore & Shohl LLP; Yongsok Choi, Esq.

(57) ABSTRACT

According to an embodiment, a holographic microscope comprises a light source emitting light to an object, a beam splitter reflecting the light emitted from the light source to the object and transmitting object light reflected from the object, a holographic image sensor sensing information, including a holographic image, by receiving the object light and allowing the object light to coherently interfere with reference light, and an image processor obtaining three-dimensional (3D) information about the object based on the information sensed by the holographic image sensor. The holographic image sensor includes a lens focusing the object light to the holographic image sensor, a filter transmitting a predetermined wavelength band of light of the focused object light, a light receiving unit receiving interference light to sense a holographic image, and a reference light source directly emitting the reference light having the predetermined wavelength band to the light receiving unit.

12 Claims, 4 Drawing Sheets

HOLOGRAPHIC MICROSCOPE INCLUDING HOLOGRAPHIC IMAGE SENSOR

CROSS-REFERENCE TO RELATED APPLICATION(S)

This application is based on and claims priority under 35 U.S.C. 119 to Korean Patent Application No. 10-2021-0192126, filed on Dec. 30, 2021, in the Korean Intellectual Property Office, the disclosure of which is herein incorporated by reference in its entirety.

TECHNICAL FIELD

Embodiments of the disclosure relate to a holographic microscope with enhanced holographic characteristics by including a holographic image sensor.

DESCRIPTION OF RELATED ART

The description of the Discussion of Related Art section merely provides information that may be relevant to embodiments of the disclosure but should not be appreciated as necessarily constituting the prior art.

A common optical microscope is a device that measures the shape of an object by measuring the intensity of light emitted from a light source and reflected or transmitted through the object. On the other hand, a digital holographic microscope is a device that measures the interference and diffraction of light that occurs when light is radiated on an object and digitally records it. A digital holographic microscope restores or reconstructs the shape information about the object from the recorded information.

Meanwhile, a digital holographic microscope generates light of a single wavelength, such as a laser beam, and divides it into two light beams using an optical splitter. One light beam is radiated directly to the image sensor (this light beam is referred to as reference light), and the other light beam is radiated to the object to be measured (also referred to as a target object). When the light reflected from the object is incident on the image sensor (this light is referred to as object light), the reference light and object light may interfere with each other on the image sensor. The digital holographic microscope records such light interference fringe information with a digital image sensor, and restores or reconstructs the shape of the target object using a computer, based on the recorded interference fringe information. In this case, the recorded interference fringe information is generally referred to as a hologram.

As compared with the conventional optical holographic scheme, the digital holographic microscope differs in that the digital holographic microscope measures and digitally stores light interference fringe information by a digital image sensor. As another difference, the digital holographic microscope restores the shape of the target object by processing the stored interference fringe information by, e.g., a computer device, rather than in an optical scheme.

However, the conventional optical holographic microscope requires a separate optical structure for forming reference light. As the optical structure for forming reference light is included in the holographic microscope, the holographic microscope is difficult to lighten and downsize. Further, the conventional holographic microscope has poor vibration characteristics due to external vibration and suffers from quality degradation of the sensed image due to speckle noise caused by the optical structure for forming reference light.

SUMMARY

According to an embodiment, there is provided a lightweight, downsized holographic microscope capable of enhancing the quality of the image to be output.

According to an embodiment, a holographic microscope comprises a light source emitting light to an object, a beam splitter reflecting the light emitted from the light source to the object and transmitting object light reflected from the object, a holographic image sensor sensing information, including a holographic image, by receiving the object light and allowing the object light to coherently interfere with reference light, and an image processor obtaining three-dimensional (3D) information about the object based on the information sensed by the holographic image sensor. The holographic image sensor includes a lens focusing the object light to the holographic image sensor, a filter transmitting a predetermined wavelength band of light of the focused object light, a light receiving unit receiving interference light to sense a holographic image, and a reference light source directly emitting the reference light having the predetermined wavelength band to the light receiving unit.

The holographic microscope may further comprise a first collimator preventing dispersion of the light emitted from the light source.

The holographic microscope may further comprise a mirror reflecting the light transmitted through the first collimator.

The holographic microscope may further comprise a convex lens focusing the light reflected from the mirror, and a second collimator spaced apart from the convex lens by a predetermined distance to convert the light from the convex lens into parallel light to thereby adjust a beam width of the light.

The second collimator may allow the parallel light to propagate to the beam splitter.

The reference light source may include a nano wire transistor.

According to an embodiment, a holographic microscope comprises a light source emitting light to an object, a beam splitter reflecting the light emitted from the light source to the object and transmitting object light reflected from the object, a holographic image sensor sensing information, including a holographic image, by receiving the object light and allowing the object light to coherently interfere with reference light, and an image processor obtaining three-dimensional (3D) information about the object based on the information sensed by the holographic image sensor. The holographic image sensor includes a lens focusing object light incident from outside of the holographic image sensor to the holographic image sensor, a reflective coating formed on an inner surface of the lens, a filter transmitting a predetermined wavelength band of light of the focused object light, a light receiving unit receiving interference light to sense a holographic image, and a reference light source emitting the reference light having the predetermined wavelength band to the lens.

The holographic microscope may further comprise a first collimator preventing dispersion of the light emitted from the light source.

The holographic microscope may further comprise a mirror reflecting the light transmitted through the first collimator.

The holographic microscope may further comprise a convex lens focusing the light reflected from the mirror, and a second collimator spaced apart from the convex lens by a predetermined distance to convert the light from the convex lens into parallel light to thereby adjust a beam width of the light.

The second collimator may allow the parallel light to propagate to the beam splitter.

The reference light source may include a nano wire transistor.

According to embodiments, it is possible to provide a lightweight, downsized holographic microscope capable of enhancing the quality of the image to be output.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Various changes may be made to the present invention, and the present invention may come with a diversity of embodiments. Some embodiments of the present invention are shown and described in connection with the drawings. However, it should be appreciated that the present disclosure is not limited to the embodiments, and all changes and/or equivalents or replacements thereto also belong to the scope of the present disclosure. Similar reference denotations are used to refer to similar elements throughout the drawings.

The terms "first" and "second" may be used to describe various components, but the components should not be limited by the terms. The terms are used to distinguish one component from another. For example, a first component may be denoted a second component, and vice versa without departing from the scope of the present disclosure. The term "and/or" may denote a combination(s) of a plurality of related items as listed or any of the items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

The terms as used herein are provided merely to describe some embodiments thereof, but not to limit the present disclosure. As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the present disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1:
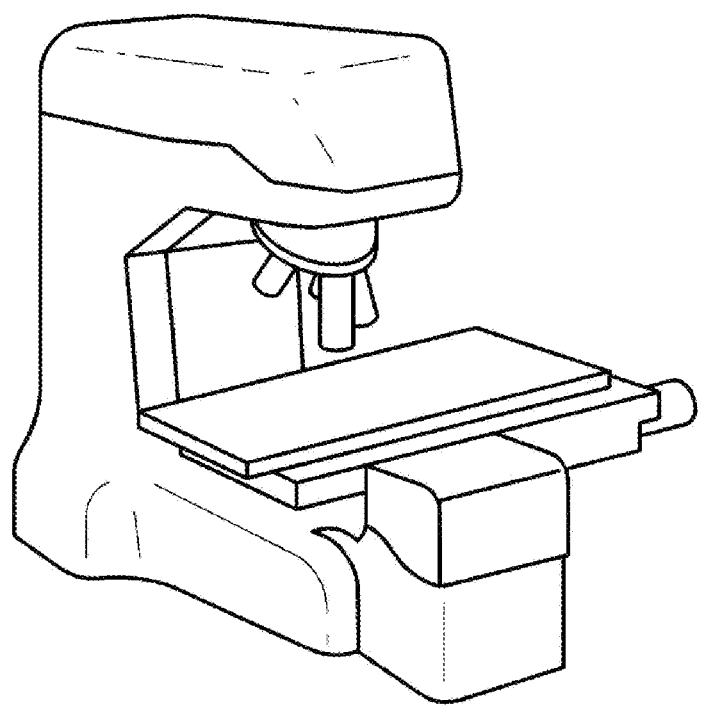
FIG. 1 is a view illustrating a holographic microscope according to an embodiment of the disclosure.

FIG. 1 is a view illustrating a holographic microscope according to an embodiment of the disclosure.

The holographic microscope 100 measures the shape of an object by analyzing holographic information acquired using the interference phenomenon and the object light (also referred to as object beam) reflected from or transmitted through the object. The holographic microscope 100 emits light to the object and obtains the object light and generates reference light without a separate optical configuration or component for obtaining reference light and allows the reference light and the object light to interfere with each other. The holographic microscope 100 receives the interference light, resultant from interference between the reference light and the object light, through the image sensor to thereby sense the interference information about the interference light, thereby obtaining three-dimensional (3D) information, e.g., the shape of the object.

Figure 2:
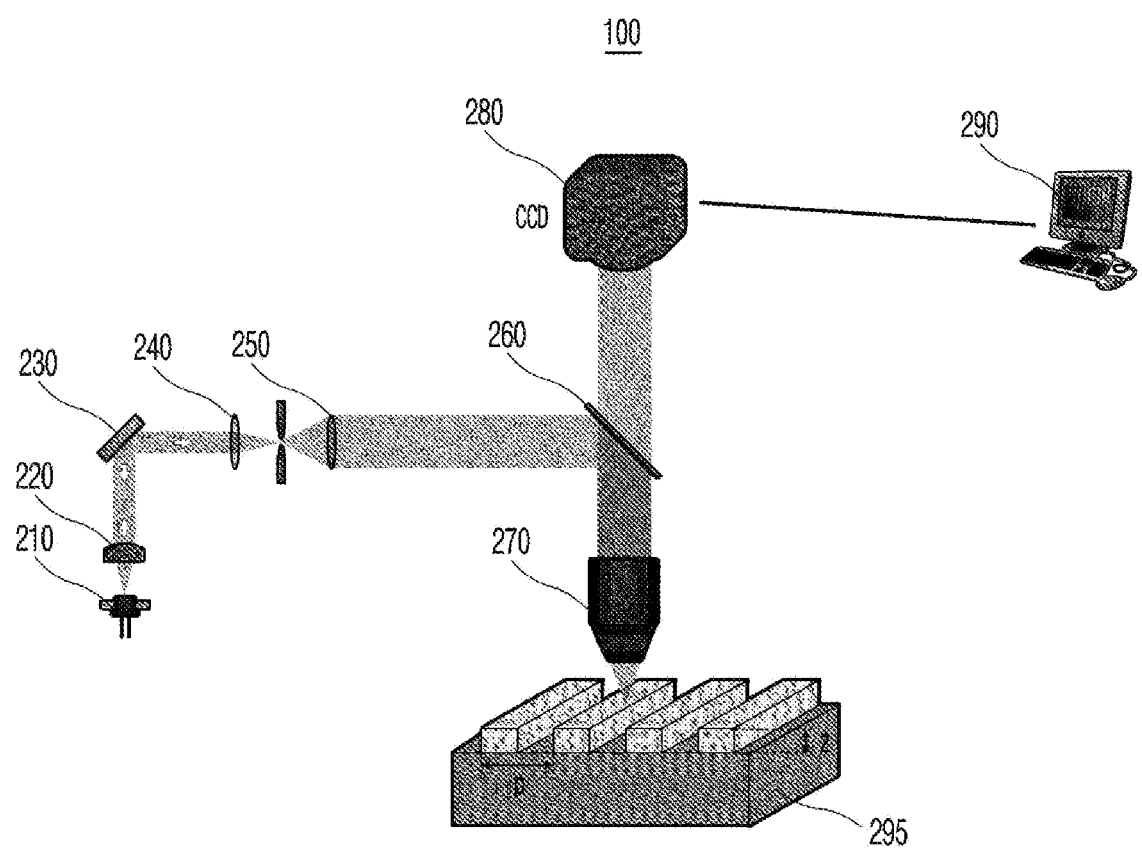
FIG. 2 is a view illustrating a configuration of a holographic microscope according to an embodiment of the disclosure.

FIG. 2 is a view illustrating a configuration of a holographic microscope according to an embodiment of the disclosure.

Referring to FIG. 2, according to an embodiment, a holographic microscope 100 includes a light source 210, collimators 220 and 250, a mirror 230, a convex lens 240, a beam splitter 260, an objective lens 270, a holographic image sensor 280 (also simply referred to as a 'sensor'), and an image processor 290.

The light source 210 emits light to an object 295 (also referred to as a target object).

The collimator 220 prevents dispersion of the light emitted from the light source 210. The collimator 220 receives the light from the light source 210 and converts the received light into parallel light so that the light from the light source 210 is wholly reflected by the mirror 230.

The mirror 230 allows the light transmitted through the collimator 220 to be incident on the convex lens 240.

The convex lens 240 and the collimator 250 adjust the beam width of the light to be incident on the target object 295. The convex lens 240 focuses the incident light, and the collimator 250 receives the light focused by the convex lens 240 and converts the received light into parallel light. The beam width of the light to be output through the collimator 250 may be determined depending on the distance between the convex lens 240 and the collimator 250.

The light transmitted through the collimator 250 is incident on the beam splitter 260. The beam splitter 260 reflects the light emitted from the light source 210 to the target object 295 and transmits the object light reflected by the target object 295.

The objective lens 270 receives the light reflected by the beam splitter 260 to the target object 295 and focuses the received light to the target object 295.

The sensor 100 receives the incident object light through the beam splitter 260 and allows the object light to coherently interferes with the reference light while sensing the holographic image. The sensor 280 is a device or element that digitalizes hologram information and stores it. The sensor 100 constitutes one pixel unit and senses and stores a point hologram.

In this case, when receiving the object light, the sensor 280 by itself may allow the object light to coherently interfere with the reference light, sensing the holographic image, unlike in the conventional art. Accordingly, the holographic microscope 100 including the sensor 280 does not need a separate optical structure for splitting light to create reference light separately from the object light or leading to light interference. This brings about the following effects.

Since there is no need for a separate optical structure for creating reference light, the microscope may have a light-weight and compact form factor.

When vibration occurs from the outside, the vibration may be transferred to each component of the microscope. In this case, since the holographic microscope 100 does not include a separate optical structure for forming reference light, other than an optical structure for forming object light, noise due to the vibration may be relatively reduced.

Inclusion of an optical structure essentially leads to creation of speckle noise. However, the holographic microscope according to an embodiment does not include an optical structure for forming reference light and may thus reduce speckle noise.

A specific structure of the sensor 280 is described below with reference to FIGS. 3 to 6.

The image processor 290 acquires three-dimensional (3D) information about the object based on the information sensed by the sensor 280. The image processor 290 may accurately obtain the 3D information about the object based on microscopic information about the object derived from the interference information sensed by the sensor 280.

Although FIG. 2 illustrates various components 220 to 250 for forming object light in the holographic microscope 100, embodiments of the disclosure are not limited thereto. If it is possible to adjust the beam width of the light to be incident on the object 295, the light source may directly emit light to the beam splitter 260.

Figure 3:
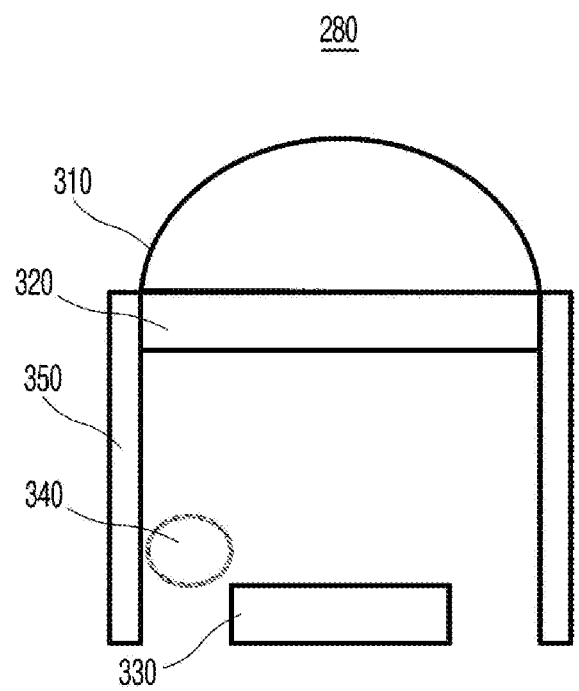
FIG. 3 is a cross-sectional view illustrating a configuration of a holographic image sensor according to an embodiment.
Figure 4:
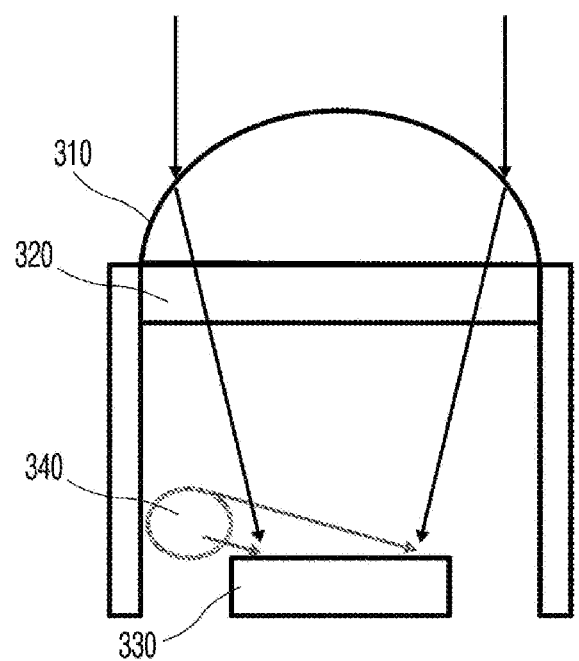
FIG. 4 is a view illustrating an operation of a holographic image sensor according to an embodiment.

FIG. 3 is a cross-sectional view illustrating a configuration of a holographic image sensor according to an embodiment. FIG. 4 is a view illustrating an operation of a holographic image sensor according to an embodiment.

The object light (also referred to as the object beam), which is incident from the outside to the sensor 280, is focused on the light receiving unit 330 by the lens 310. The lens 310 may be a convex lens. The lens 110 is positioned on a front end of the filter 320 to receive the incident object light and focuses the object light to the light receiving unit 330.

The filter 320 filters the object light entering through the lens 310 and transmits only a predetermined wavelength band of light, of the object light. The filter 320 filters out the other wavelength bands of light than the predetermined wavelength band of light, allowing the object light in the sensor 280 to have a predetermined wavelength.

The reference light source 340 is attached, in one position, to the barrier rib 350, to directly emit a predetermined wavelength band of light (e.g., reference light) to the light receiving unit 330. The reference light source 340 directly emits the reference light to the light receiving unit 330 without a separate optical structure. The reference light source 340 may be implemented as a nono wire transistor. The reference light source 340 has a different optical axis from that the object light coming through the lens 310 and the filter 320 to the light receiving unit 330. As the reference light source 340 directly emits the reference light to the light receiving unit 330, the light receiving unit 330 may sense the object, as a holographic image. In particular, since only the predetermined wavelength band of object light filtered by the filter 320 is incident on the light receiving unit 330, the reference light source 340 emits the predetermined wavelength band of reference light, causing coherence with the object light.

The light receiving unit 330 may be implemented as a light sensing device or element, e.g., a photodiode, and receive the interference light and sense a holographic image. By passing through the filter 320, the object light may be interfered with the reference light from the reference light source 340 and is incident on the light receiving unit 330. Thus, the light receiving unit 330 may sense the holographic image for the object.

The barrier rib 350 supports the reference light source 340 and prevents light interference between sensors 280. As described above, as the sensor 280 constitutes one pixel unit, a plurality of sensors 280 may be arrayed. Such an occasion may occur where the reference light from one sensor is directed to the adjacent sensor. To prevent such an occasion, the barrier rib 350 is disposed adjacent to the light receiving unit 330. The barrier rib 350 blocks other light, which may come from the outside to the light receiving unit 330, than the above-described object light and reference light, preventing other light than the object light and the reference light from being incident on the light receiving unit 330.

As the sensor 280 is so structured, it is possible to secure coherence for the object light even without a separate optical system. Accordingly, the sensor 280 may have a significantly lightened, downsized form factor.

Figure 5:
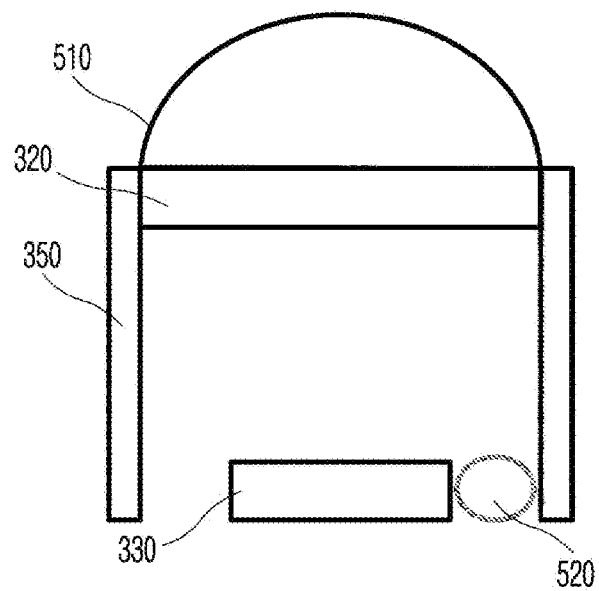
FIG. 5 is a cross-sectional view illustrating a configuration of a holographic image sensor according to an embodiment.
Figure 6:
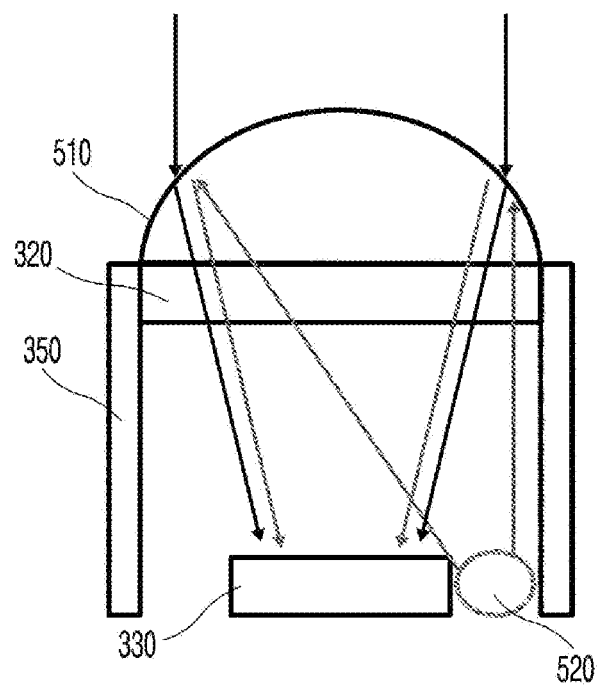
FIG. 6 is a view illustrating an operation of a holographic image sensor according to an embodiment.

FIG. 5 is a cross-sectional view illustrating a configuration of a holographic image sensor according to an embodiment. FIG. 6 is a view illustrating an operation of a holographic image sensor according to an embodiment.

Referring to FIGS. 5 and 6, according to an embodiment, a holographic image sensor 280 (simply referred to as a 'sensor') may include a lens 510, a filter 320, a reference light source 520, a light receiving unit 330, and a barrier rib 350.

The filter 320, the light receiving unit 330, and the barrier rib 350 may be substantially identical in configuration, structure, function, or operation to the filter 320, the light receiving unit 330, and the barrier rib 350 described above in connection with FIGS. 3 and 4.

The lens 510 may perform substantially the same operation as the lens 310. However, unlike the lens 310, the lens 510 includes a reflective coating (not shown) on an inner surface thereof, e.g., the inner surface facing the filter 320. Thus, the lens 510 focuses the object light incident from outside, to the light receiving unit 330 and reflects the reference light from the reference light source 520 to, e.g., the light receiving unit 330. Since the lens 510 is shaped to be able to focus the object light incident from the outside, to the light receiving unit 330, the lens 510 reflects the reference light from the reference light source 520 to be focused to the light receiving unit 330.

The reference light source 520 emits the reference light to the lens 510. Unlike the reference light source 340, the reference light source 520 emits the reference light to the lens 510, rather than directly emitting the reference light to the light receiving unit 330. The emitted reference light is reflected by the lens 510 to propagate along the same optical axis as the optical axis of the object light or with a predetermined angular difference between its optical axis and the optical axis of the object light. Thus, the light receiving unit 330 may sense the holographic image.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. A holographic microscope, comprising:
   a light source emitting light to an object;
   a beam splitter reflecting the light emitted from the light source to the object and transmitting object light reflected from the object;
   a holographic image sensor sensing information, including a holographic image, by receiving the object light and allowing the object light to coherently interfere with reference light; and
   an image processor obtaining three-dimensional (3D) information about the object based on the information sensed by the holographic image sensor, wherein the holographic image sensor includes:
   a lens focusing the object light to the holographic image sensor;
   a filter transmitting a predetermined wavelength band of light of the focused object light;
   a light receiving unit receiving interference light to sense a holographic image; and
   a reference light source directly emitting the reference light having the predetermined wavelength band to the light receiving unit without a separate optical structure between the reference light source and the light receiving unit, wherein an optical axis of the reference light incident on the light receiving unit is different from an optical axis of the object light incident on the light receiving unit.

2. The holographic microscope of claim 1, further comprising a first collimator preventing dispersion of the light emitted from the light source.

3. The holographic microscope of claim 2, further comprising a mirror reflecting the light transmitted through the first collimator.

4. The holographic microscope of claim 3, further comprising:

a convex lens focusing the light reflected from the mirror; and
a second collimator spaced apart from the convex lens by a predetermined distance to convert the light from the convex lens into parallel light to thereby adjust a beam width of the light.

5. The holographic microscope of claim 4, wherein the second collimator allows the parallel light to propagate to the beam splitter.

6. The holographic microscope of claim 1, wherein the reference light source includes a nano wire transistor.

7. A holographic microscope, comprising:
   a light source emitting light to an object;
   a beam splitter reflecting the light emitted from the light source to the object and transmitting object light reflected from the object;
   a holographic image sensor sensing information, including a holographic image, by receiving the object light and allowing the object light to coherently interfere with reference light; and
   an image processor obtaining three-dimensional (3D) information about the object based on the information sensed by the holographic image sensor, wherein the holographic image sensor includes:
   a lens focusing object light incident from outside of the holographic image sensor to the holographic image sensor, a reflective coating formed on an inner surface of the lens;
   a filter transmitting a predetermined wavelength band of light of the focused object light;
   a light receiving unit receiving interference light to sense a holographic image; and
   a reference light source emitting the reference light having the predetermined wavelength band to the lens.

8. The holographic microscope of claim 7, further comprising a first collimator preventing dispersion of the light emitted from the light source.

9. The holographic microscope of claim 8, further comprising a mirror reflecting the light transmitted through the first collimator.

10. The holographic microscope of claim 9, further comprising:
    a convex lens focusing the light reflected from the mirror; and
    a second collimator spaced apart from the convex lens by a predetermined distance to convert the light from the convex lens into parallel light to thereby adjust a beam width of the light.

11. The holographic microscope of claim 10, wherein the second collimator allows the parallel light to propagate to the beam splitter.

12. The holographic microscope of claim 7, wherein the reference light source includes a nano wire transistor.

* * * * *